US006429622B1

(12) United States Patent
Svensson

(10) Patent No.: US 6,429,622 B1
(45) Date of Patent: Aug. 6, 2002

(54) METHOD AND APPARATUS FOR AUTHENTICATING A CHARGING UNIT BY A PORTABLE BATTERY-OPERATED ELECTRONIC DEVICE

(75) Inventor: Lars Svensson, Göteborg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/711,998

(22) Filed: Nov. 14, 2000

(51) Int. Cl.⁷ ............................................. H01M 10/46
(52) U.S. Cl. ...................................................... 320/106
(58) Field of Search ............................... 320/106, 110, 320/114, 115, 135, DIG. 12

(56) References Cited

U.S. PATENT DOCUMENTS

| | | | |
|---|---|---|---|
| 5,349,535 A | 9/1994 | Gupta | 364/483 |
| 5,367,242 A | * 11/1994 | Hulman | |
| 5,369,352 A | 11/1994 | Toepfer et al. | 320/56 |
| 5,420,493 A | 5/1995 | Hargadon et al. | 320/15 |
| 5,506,490 A | 4/1996 | DeMuro | 320/23 |
| 5,592,069 A | 1/1997 | Dias et al. | 320/30 |
| 5,596,567 A | 1/1997 | deMuro et al. | 320/5 |
| 5,602,454 A | 2/1997 | Arakawa et al. | 320/2 |
| 5,717,307 A | 2/1998 | Barkat et al. | 320/5 |
| 5,729,115 A | 3/1998 | Wakefield | 320/2 |
| 5,734,252 A | 3/1998 | Griffin et al. | 320/2 |
| 5,754,029 A | 5/1998 | Mann et al. | 320/106 |
| 5,859,522 A | 1/1999 | Theobald | 320/106 |
| 5,867,006 A | 2/1999 | Dias et al. | 320/106 |
| 5,963,012 A | 10/1999 | Garcia et al. | 320/106 |
| 6,031,353 A | * 2/2000 | Banyas et al. | |
| 6,295,002 B1 | * 9/2001 | Fukuda | |

FOREIGN PATENT DOCUMENTS

| | | |
|---|---|---|
| EP | 0684680 A1 | 11/1995 |
| WO | WO 95/06994 | 3/1995 |

OTHER PUBLICATIONS

EPO; European Standard Search Report; Jun. 20, 2001.

* cited by examiner

Primary Examiner—Edward H. Tso
(74) Attorney, Agent, or Firm—Jenkens & Gilchrist, P.C.

(57) ABSTRACT

A portable battery-operated electronic device authenticates/identifies a charging unit in order to prevent an incompatible and/or poorly designed or constructed charging unit from possibly damaging the portable battery-operated electronic device. The authentication/identification is effectuated over a wireless interface (e.g., using Bluetooth transceivers) when a portable battery-operated electronic device detects connection to a charging unit. The portable battery-operated electronic device requests data related to source and/or compatibility of the charging unit. If data is received and it indicates a proper source and/or compatibility, the portable battery-operated electronic device permits the charging. Otherwise, the portable battery-operated electronic device executes an action, such as preventing charging and/or memorializing information about the risky charging.

30 Claims, 4 Drawing Sheets

METHOD AND APPARATUS FOR AUTHENTICATING A CHARGING UNIT BY A PORTABLE BATTERY-OPERATED ELECTRONIC DEVICE

BACKGROUND OF THE INVENTION

1. Technical Field of the Invention

The present invention relates in general to the field of portable battery-operated electronic devices, and in particular, by way of example but not limitation, to identifying and/or authenticating a battery charging unit when it is connected to a portable battery-operated electronic device.

2. Description of Related Art

Portable battery-operated electronic devices have become an increasingly important part of our modern technological society. No longer are these devices considered a luxury, available only to the rich and affluent. Rather, as people become more mobile through their jobs, recreational activities and lifestyle choices, they have become increasingly more reliant upon the convenience and services that portable electronic devices offer. Moreover, with the advances in semiconductor technology and integrated circuit miniaturization, portable electronic devices have become smaller, lighter, and increasingly more sophisticated. These aspects of portable electronic devices have enabled users to fully exploit technological advances in a manner and under circumstances that would be impossible using conventional stationary systems. When these portable electronic devices incorporate communication capabilities, such as cellular radio, the portable electronic device becomes even more advantageous. Many users, in fact, rely upon their portable electronic device as their sole means of communication while they are traveling or visiting customers. Many users also appreciate the enhanced security provided by the ability to contact family, friends or emergency services from remote locations. With these advantages, it is no wonder that portable electronic devices have experienced an almost exponential increase in demand and have become critical to the lives and livelihood of many individuals.

One of the problems experienced with portable electronic devices, however, is that these small hand-held devices are powered by small, rechargeable batteries that normally provide a limited number of hours of active service. Once the batteries are discharged below a certain level, the portable electronic device will cease to function. The battery or batteries will then need to be recharged before the user may utilize the functions and services of the portable electronic device. Portable battery-operated electronic devices are typically recharged using a battery charging unit. A portable battery-operated electronic device may be placed within a cradling area of the battery charging unit to activate and effectuate the recharging process. Alternatively, a portable battery-operated electronic device may be connected to the battery charging unit via a cable and a connector.

Because a battery charging unit is connected to a strong power source and may be designed to rapidly recharge one or more depleted batteries, it may have the capacity to seriously damage the portable battery-operated electronic device to which it is connected. An inadequately designed and/or poorly manufactured battery charging unit may therefore cause significant harm to the portable battery-operated electronic device that it is intended to return to normal functioning by recharging the associated battery. The damaging of the portable battery-operated electronic device results in harming two entities. First, the user of the portable battery-operated electronic device is unable to utilize it until it is repaired or replaced, possibly at his or her expense. Second, if the portable battery-operated electronic device is under warranty, then the manufacturer may need to expend significant resources to repair or replace the damaged device.

Frequently, when an inadequately designed and/or poorly manufactured battery charging unit damages a portable battery-operated electronic device, the defective battery charging unit is produced and sold by a manufacturer other than the manufacturer of the portable battery-operated electronic device. In other words, one company may produce and sell a battery charging unit that is advertised to be compatible with the portable battery-operated electronic device of another company, but the battery charging unit is faulty inasmuch as it damages the portable battery-operated electronic device. Unfortunately, this can result in the entity that is responsible for the damage (e.g., the producer and/or seller of the faulty battery charging unit) avoiding the expense of fixing the damaged portable battery-operated electronic device while the owner or manufacturer thereof is left to pay for fixing the damages caused by another.

SUMMARY OF THE INVENTION

The deficiencies of the prior art are overcome by the method, system, and apparatus of the present invention. For example, as heretofore unrecognized, it would be beneficial if attempted charging using an unauthorized charging unit could be detected. In fact, it would be beneficial if such unauthorized charging could be memorialized or prevented before the charging begins in order to protect innocent parties.

Portable battery-operated electronic devices (e.g., a communication unit such as a mobile terminal, a personal digital assistant (PDA), a calculator, etc.) gradually deplete their batteries during use. In accordance with the present invention, such devices are enabled to pro-actively interact with a connected charging unit in order to limit exposure to faulty, potentially-damage-causing charging units. When a portable battery-operated electronic device detects connection to a charging unit, the portable battery-operated electronic device transmits an inquiry over a wireless link that requests data related to source and/or compatibility. A charging unit in accordance with the present invention that receives the inquiry transmits the requested data in response. If the received requested data indicates that the charging unit is an appropriate charging unit for the portable battery-operated electronic device, the portable battery-operated electronic device permits the charging to continue.

If, on the other hand, the portable battery-operated electronic device receives no requested data or the received requested data does not indicate that the charging unit is an appropriate charging unit for the portable battery-operated electronic device, then the portable battery-operated electronic device may execute one or more actions. These actions include noting the risky charging, emitting a loud noise, and/or refusing to permit the risky charging. In an alternative embodiment, in order to ensure that the portable battery-operated electronic device is connected to the same charging unit with which wireless communication has been established, the portable battery-operated electronic device orders the charging unit to vary the voltage supply applied to the charging contacts. If the voltage is not varied, then the portable battery-operated electronic device may execute the one or more actions as described above.

The technical advantages of the present invention include, but are not limited to, the following. It should be understood that particular embodiments may not involve any, much less all, of the following exemplary technical advantages.

An important technical advantage of the present invention is that it enables a portable battery-operated electronic device to authenticate/identify a charging unit.

Another important technical advantage of the present invention is that it provides the ability to prevent or at least memorialize a risky charging of the battery or batteries of the portable battery-operated electronic device.

Yet another important technical advantage of the present invention is the ability to reduce the chances that an innocent party will be inconvenienced by or required to pay for damages caused by another party.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein:

FIG. 1 illustrates a portion of an exemplary environment in which an exemplary portable battery-operated electronic device and an associated charging unit may operate in accordance with an embodiment of the present invention;

DETAILED DESCRIPTION OF THE DRAWINGS

Figure 2A:
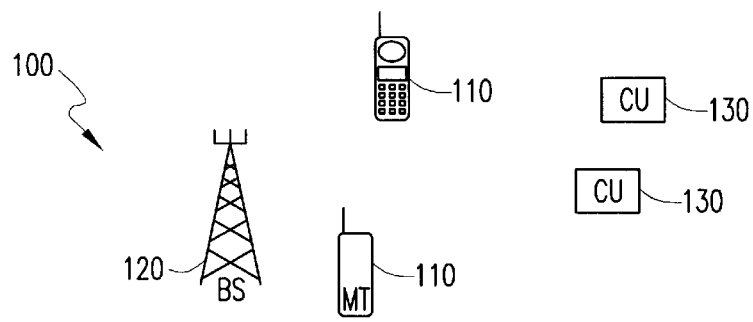
FIG. 2A illustrates an exemplary portable battery-operated electronic device and an associated exemplary charging unit in accordance with the present invention.

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

A preferred embodiment of the present invention and its advantages are best understood by referring to FIGS. 1–6 of the drawings, like numerals being used for like and corresponding parts of the various drawings.

As alluded to hereinabove, counterfeit battery chargers can be very costly in terms of illegitimate warranty work and inconvenience to the consumer, for example. Unlike many accessories, charging units do not attach to the system contact. Consequently, charging units cannot identify themselves via the system contact. Furthermore, charging units have no separate signaling-channel, as the only two wires connecting the charging unit and the portable battery-operated electronic device are the power wires. While it is possible to overlay identifying signals on the supply voltage, such schemes may be reasonably easy to defeat with an oscilloscope. However, identification/authentication in accordance with the principles of the present invention is accomplished using a wireless link. Bluetooth technology is one example of wireless communication that involves low cost, short range transceivers that utilize cryptographic algorithms for protecting the content of transmitted information.

To that end, aspects of the air interface and other requirements/suggestions for the Bluetooth technological standard will be used to describe a preferred embodiment of the present invention. However, it should be understood that the principles of the present invention are applicable to other wireless communication standards or systems (whether currently developed or to be developed in the future), especially those involving a short-range transceiver technology.

Referring now to FIG. 1, a portion of an exemplary environment in which an exemplary portable battery-operated electronic device and an associated charging unit may operate in accordance with an embodiment of the present invention is illustrated. A (portion of) an exemplary wireless communications system 100 includes a base station (BS) 120 and multiple mobile terminals (MTs) 110. The BS 120 may be composed of a base transceiver station (BTS) and a base station controller (BSC) (neither of which are shown), as is known in the art. The (portion of) exemplary wireless communications system 100 is typically composed of many cells (not explicitly shown), each with a BS 120. Each such BS 120 is capable of simultaneously communicating with more than two MTs 110. The MTs 110 are one example of portable battery-operated electronic devices that are powered by one or more batteries. As the battery (or batteries) becomes low or completely depleted, it must be recharged using a charging unit 130. Each owner of a MT 110 typically has at least one charging unit 130, which may, for example, be connected to the MT 110 to recharge the battery of the MT 110.

Referring now to FIG. 2A, an exemplary portable battery-operated electronic device and an associated exemplary charging unit in accordance with the present invention are illustrated generally at 200. The MT 110 includes charging contact(s) 210 and a short range transceiver (SR TRX) 220. It should be understood that the MT 110 is presented by way of example only and not limitation. The principles of the present invention are equally applicable to portable battery-operated electronic devices in general. Portable battery-operated electronic devices may include, for example, personal digital assistants (PDAs), calculators, palm-sized computers, etc. The CU 130A is shown in operative connection with the MT 110 via charging contact(s) 230. The CU 130A is shown as an exemplary desk/table-top-type CU. In accordance with the present invention, the CU 130A also includes a SR TRX 220, which may be composed of a separate transmitter and a separate receiver. Power input 240, which provides power to the CU 130A, is also illustrated.

Figure 2B:
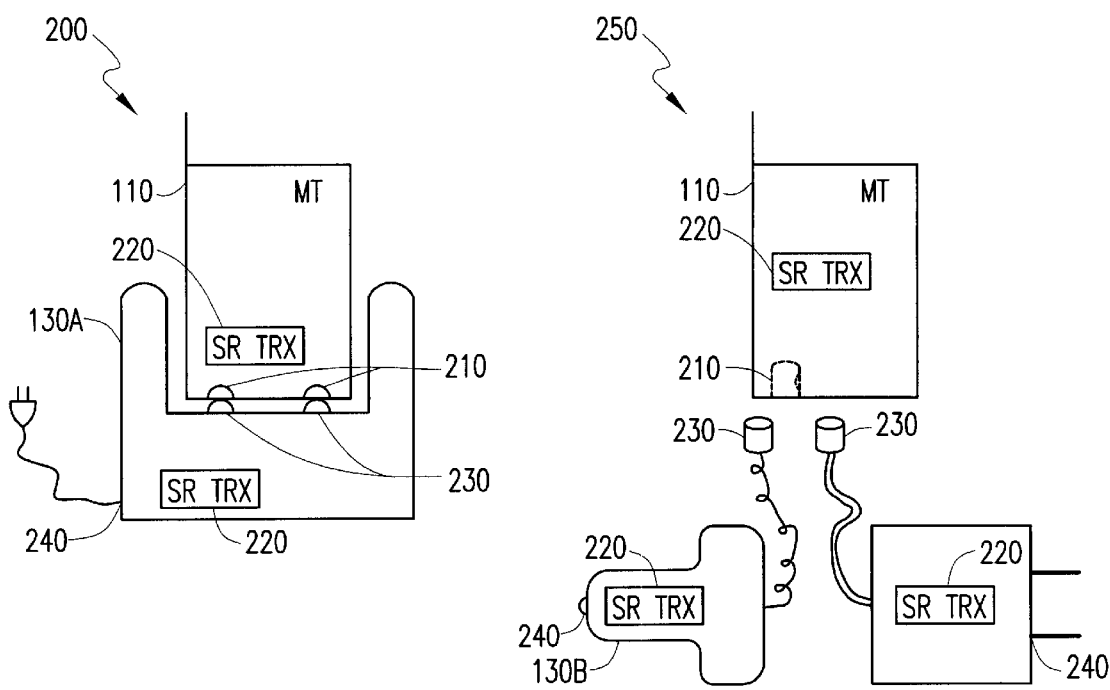
FIG. 2B illustrates an exemplary portable battery-operated electronic device and two associated exemplary charging units in accordance with the present invention.

Referring now to FIG. 2B, an exemplary portable battery-operated electronic device and two associated exemplary charging units in accordance with the present invention are illustrated generally at 250. The MT 110 is again illustrated with a SR TRX 220 and charging contact(s) 210. CUs 130B and 130C are shown in nearly operative connection with the MT 110 at charging contacts 210 via charging contacts 230 of the CUs 130B and 130C. While CUs 130B and 130C also each include a SR TRX 220 and a power input 240, CUs 130B and 130C are shown as exemplary 12-volt DC adapter-type (e.g., for a vehicle) and 110-volt AC-type (e.g., for a wall outlet) CUs, respectively. It should be noted that the principles of the present invention are applicable regardless of the type and/or shape of the CU 130. As will -be described in greater detail hereinbelow, the SR TRX 220 of the MT 110 and the SR TRX 220 of the CU 130 communicate therebetween in order for the MT 110 to authenticate/identify the CU 130.

Figure 3:
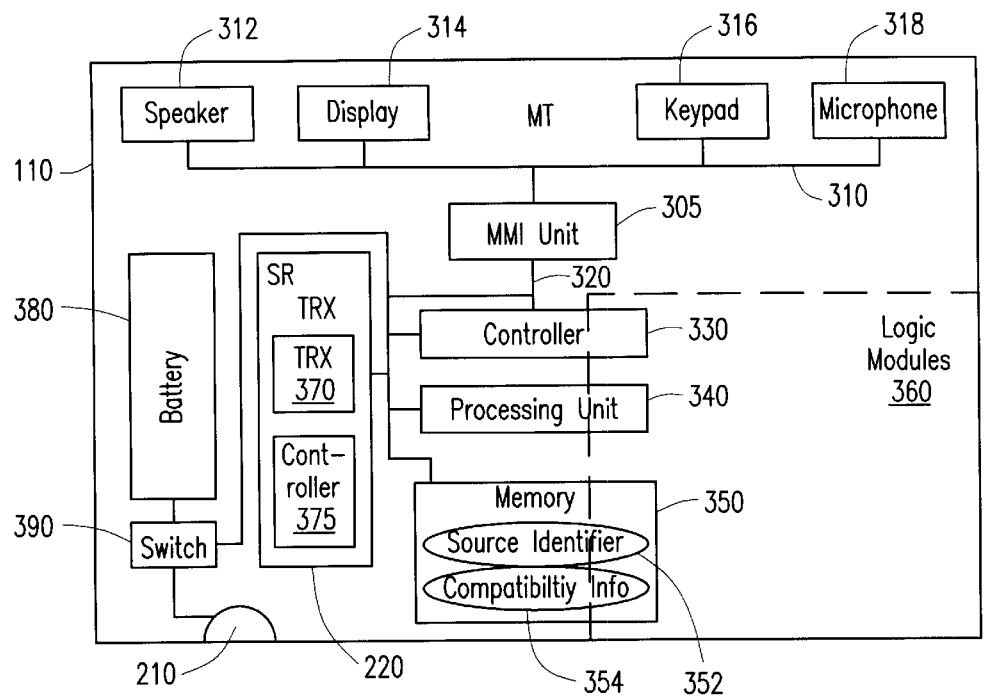
FIG. 3 illustrates the exemplary portable battery-operated electronic device of FIGS. 2A and 2B in greater detail in accordance with the present invention.

Referring now to FIG. 3, the exemplary portable battery-operated electronic device of FIGS. 2A and 2B in accordance with the present invention is illustrated in greater detail. The MT 110 includes a man-machine interface (MMI) unit 305 that enables interaction between the MT 110 and a user. The MMI unit 305 is connected to and may control a speaker 312, a display 314, a keypad 316, and a microphone 318. The MMI unit 305 is also connected to a bus 320, which interconnects various elements of the MT 110. A controller 330, a processing unit 340, and a memory 350 may also be connected to the bus 320. As will be explained in greater detail hereinbelow, the memory 350 includes a source identifier 352, compatibility information 354, or both. It should be noted that two processors (e.g., a controller 330 and a processing unit 340) are not both necessary for an embodiment of the present invention. One or more logic modules.360 may also be present within the MT 110. The one or more logic modules 360 may be designed, programmed, etc. to effectuate the principles of the present invention. In other words, the one or more logic modules 360 may be software residing in the memory 350 (or another memory (not shown) that may program the processing unit 340 to implement the principles of the present invention. Alternatively, the one or more logic modules 360 may be hardware embodied in the controller 330 that implements the principles of the present invention. Other hardware, software, firmware, some combination thereof, etc. alternatives are within the scope of the present invention.

The SR TRX 220 of the MT 110 may also be connected to the bus 320. The SR TRX 220 may be composed of a TRX 370 and an optional controller 375. The controller 375 is optional if, for example, other elements of the MT 110 (e.g., a controller 330 and/or a processing unit 340) are established so as to control the TRX 370. The bus 320 is also connected to a switch 390, which may be activated or deactivated to control the application of power from the charging contact 210 to the battery 380.

Figure 4:
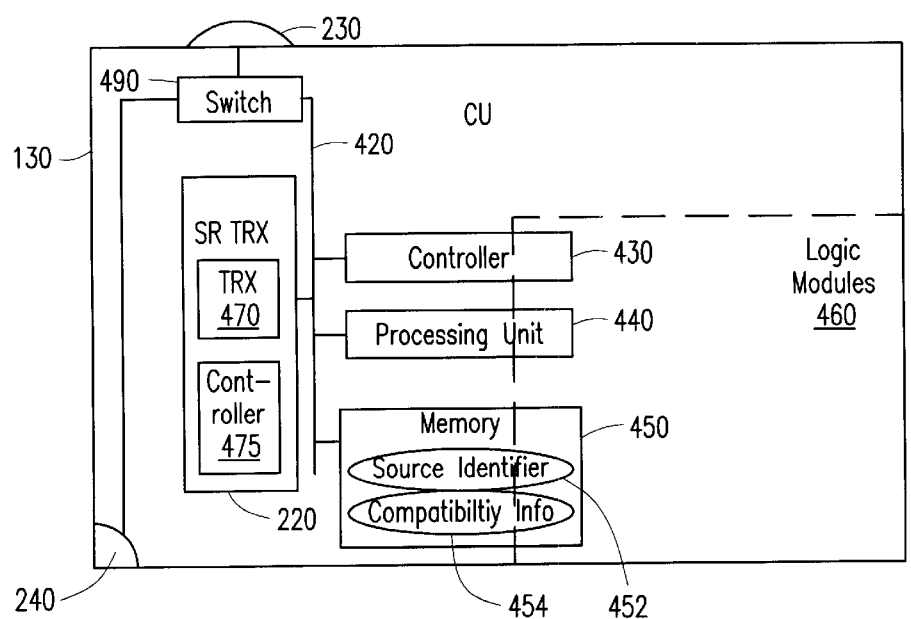
FIG. 4 illustrates the exemplary charging units of FIGS. 2A and 2B in greater detail in accordance with the present invention.

Referring now to FIG. 4, the exemplary charging units of FIGS. 2A and 2B in accordance with the present invention are illustrated in greater detail. The charging contact 210 (of FIG. 3, for example) of the MT 110 is connected to the charging contact 230 of the CU 130. The CU 130 recharges the battery 380 by transferring power that has been input from the power input 240 (after appropriate voltage reduction, regulation, etc.). The CU 130 includes a bus 420 that interconnects a controller 430, a processing unit 440, a memory 450, a SR TRX 220, and a switch 490. In one embodiment, only one processor (e.g., the controller 430, the processing unit 440, or the controller 475) is present (but one, two, three, or more processors may alternatively be present). The CU 130 includes one or more logic modules 460 that control the functions and/or operations of the CU 130. The one or more logic modules 460 may be composed of, for example, hardware, software, firmware, some combination thereof, etc. that cause the elements (e.g., the controller 430 and/or the processing unit 440 and/or the controller 475, the SR TRX 220, etc.) of the CU 130 to operate in accordance with the present invention.

The memory 450 of the CU 130 stores a source identifier 452 and/or compatibility information 454 for wireless transmission to an inquiring MT in accordance with the present invention, as described further hereinbelow with reference to FIGS. 5 and 6. The wireless transmission may occur by way of the SR TRX 220, which may include a TRX 470 and an optional controller 475. The controller 475 may be omitted if, for example, the one or more logic modules 460 control the TRX 470 through one or more other processors. In an alternative embodiment, a CU 130 may omit the controller 430 and the processing unit 440 by relying solely on the controller 475 to effectuate the features (both standard ones and those in accordance with the present invention) of a CU. In this alternative embodiment, the one or more logic modules 460 may be realized using, at least partially, the controller 475. As noted above, the CU 130 may optionally include the (variable) switch 490 that may be used to alter (e.g., reduce, shut off, etc.) the voltage applied to the charging contact 230.

Figure 5:
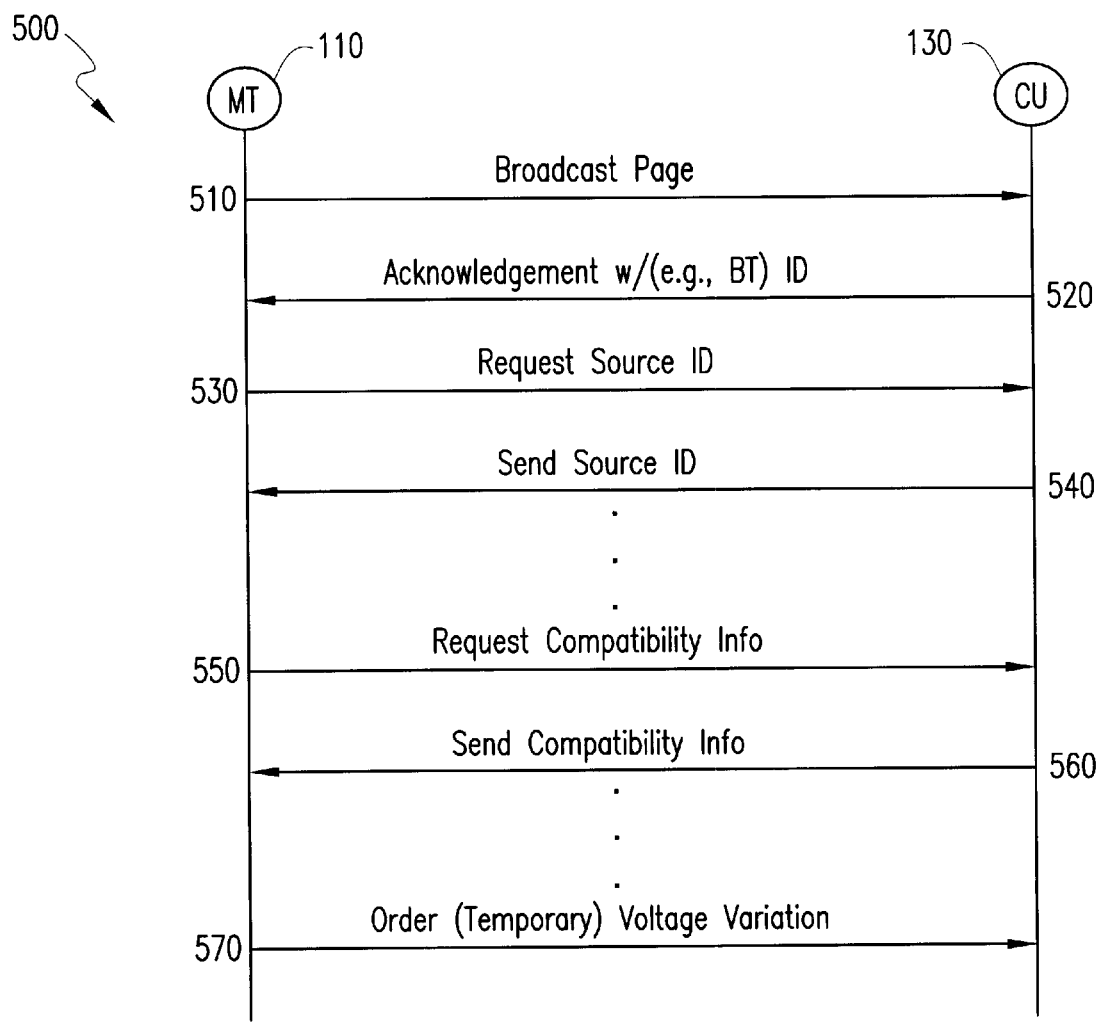
FIG. 5 illustrates an exemplary sequence diagram of wireless signals exchanged between the exemplary portable battery-operated electronic device and the exemplary charging units of FIGS. 2A and 2B in accordance with the present invention.

Referring now to FIG. 5, an exemplary sequence diagram of wireless signals exchanged between the exemplary portable battery-operated electronic device and the exemplary charging units of FIGS. 2A and 2B in accordance with the present invention is illustrated generally at 500. In accordance with one embodiment of the present invention, the SR TRXs 220 of both the MT 110 and the CU 130 are Bluetooth units (i.e., they are short range transceivers operating in accordance with the Bluetooth standard/specification in this particular embodiment). Bluetooth TRXs are designed to establish "impromptu" wireless networks with one device being the master and one or more devices being slaves. The standard ranges are 10 meters or 100 meters. Advantageously, Bluetooth TRXs are designed to encrypt and decrypt transmissions. The Bluetooth crypto thus advantageously dramatically increases the difficulty of "breaking" or "cracking" the identification process so as to fool a portable battery-operated electronic device into reacting as if a connected CU has been correctly authenticated. It should be noted that non-Bluetooth embodiments of the present invention may also advantageously involve the encryption of wireless communications between the MT 110 and the CU 130.

Referring to the sequence diagram 500, after a MT 110 detects a connection to a CU 130, the MT 110 broadcasts a (e.g., wireless Bluetooth) page (510) to any and all devices-within range that include a compatible SR TRX 220. Having a SR TRX 220, the CU 130 responds with an acknowledgment that includes an (e.g., Bluetooth) identification (ID) (520) to establish a wireless communication link (e.g., an "impromptu" wireless Bluetooth network). The MT 110 requests a source identifier (530). The source identifier may correspond to, for example, an identifier that is associated with a manufacturer of the CU 130. The identifier may be, for example, a numeral, an alpha-numeric value, a manufacturer's code and/or name, etc. If the CU 130 is performing in accordance with the principles of the present invention, the CU 130 responds by sending the source identifier 452 of the CU 130 over the wireless (e.g., Bluetooth) interface (540). The MT 110 may subsequently compare the received source identifier 452 with the stored source identifier 352.

Instead of, or in addition to, requesting a source identifier, the MT 110 may request compatibility information (550). In response to the request, the CU 130 sends the compatibility information 454 over the wireless link (560). Compatibility information may include, for example, indicia that enables a MT 110 to determine whether or not the responding CU 130 is compatible (e.g., is capable of safely recharging the battery or batteries of the MT 110 without damaging the battery and/or the MT 110). The compatibility information may be a single indication (e.g., a CU model type) such that the MT 110 can compare the single indication to a list of compatible CU models (e.g., the compatibility information 354) in, for example, the memory 350. Alternatively, the compatibility information 454 may be a list of portable battery-operated electronic devices with which the CU 130 is compatible. The MT 110 may then determine whether the MT 110, or a compatible device, is on the list by inspecting the list (e.g., and comparing entries in the list to the stored compatibility information 354).

As alluded to and explained above, received data does not necessarily need to be identical to stored data. The data transmitted by the CU 130 may be composed of, for example, only a model designation that is compared against all allowable CU models as stored in the MT 110. The total data in the MT 110 is clearly larger in this case. The opposite case in which the CU 130 informs the MT 110 of all the types of battery-operated electronic devices that it believes itself capable of safely charging while the MT 110 only knows its own type of battery-operated electronic device is possible as well. In this opposite case, the MT 110 compares its own type to all of the received types. There may be a match indicating a permissible/safe charging condition after comparison(s) in either case. For example, if a CU 130 transmits its model designation as "ABC1344", a match may be determined if the MT 110 includes stored data of "ABC1344", "ABC1234, ABC1333, ABC1344, ABC1510, DEF2145", "ABC13xx" (where "xx" indicates any digit or any alphanumeric value), etc.

It should be noted that if both a source identifier and compatibility information are requested, then they may be requested simultaneously, or compatibility information may be requested first. It should also be understood that each of the sequence signals 510, 530, and 550 may be individually or jointly referred to in a broad sense as an inquiry. In an alternative embodiment, after the MT 110 has authenticated/identified a CU 130 with which it is in wireless communication as an appropriate CU, the MT 110 may verify that the CU to which it is (e.g., physically) connected is the CU 130 to which it is also in wireless communication. The MT 110 may do so by ordering the CU 130 to (e.g., temporarily) vary the supplied voltage (570), as explained further hereinbelow.

Figure 6:
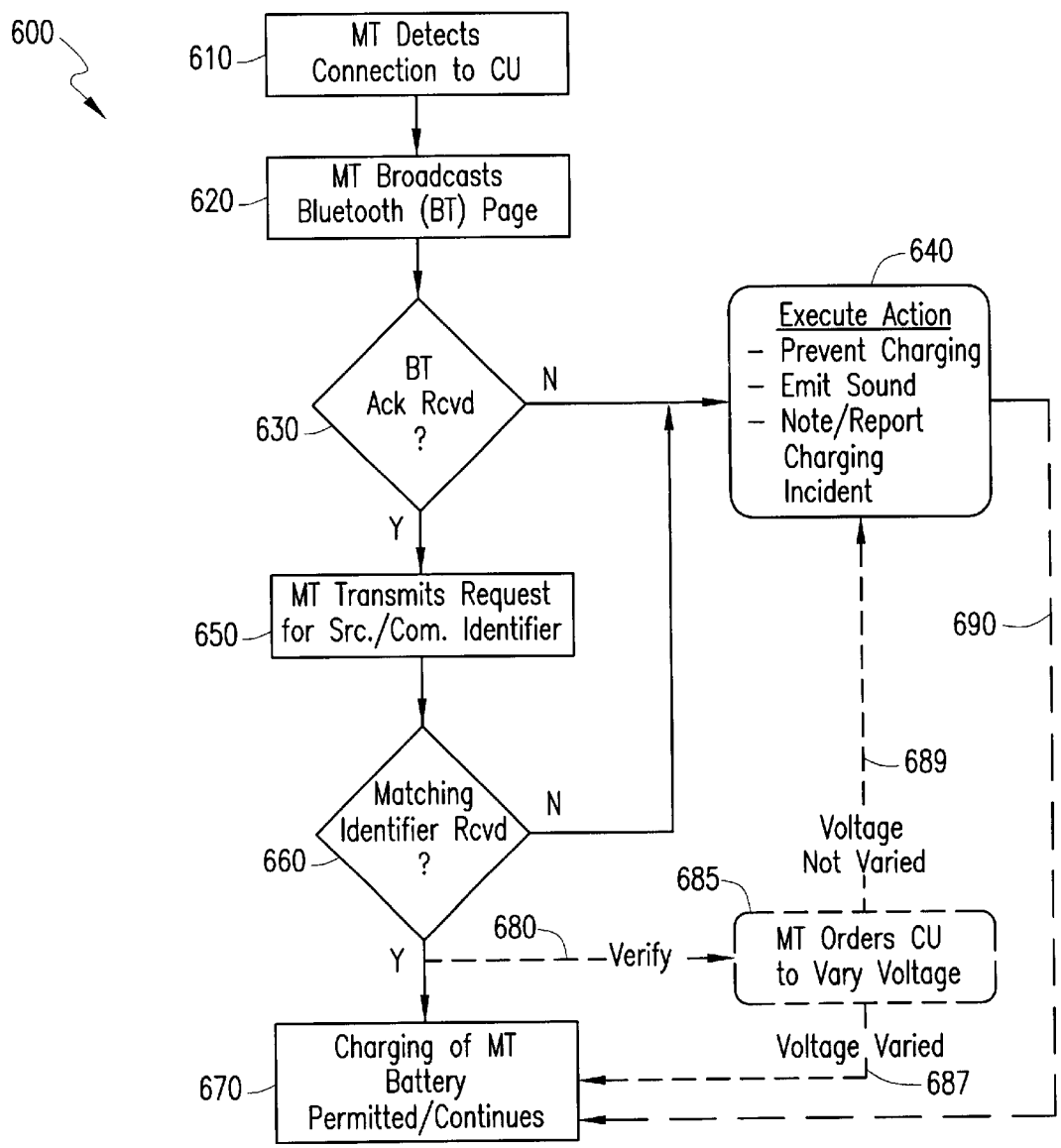
FIG. 6 illustrates an exemplary method in flowchart form in accordance with the present invention.

Referring now to FIG. 6, an exemplary method in flowchart form in accordance with the present invention is illustrated generally at 600. Initially, the MT (or, more generally, any portable battery-operated electronic device) detects connection to a CU (step 610). In response, the MT broadcasts a (e.g., Bluetooth) page (step 620). The MT awaits for an (e.g., Bluetooth) acknowledgment. If the MT does not receive an acknowledgment (at step 630), the MT executes an action (step 640). The action may be one or more of the following exemplary actions. First, the MT may prevent charging of the battery or batteries of the MT (e.g., cause the switch 390 to prevent the application of power from the charging connection 210 to the battery 380). Second, the MT may emit a loud, "attention-getting" sound (e.g., cause the MMI 305 to activate the speaker 312 with a loud noise). Third, the MT may note the charging incident (e.g., store details of when, where, how, etc. non-authenticated charging occurred in the memory 350). Subsequently, if the MT is submitted for warranty work, the memory of the MT may be inspected. If the memory reveals that the warranty terms have been violated, the manufacturer of the MT may refuse to repair the MT under the warranty, as appropriate. It should be noted that the MT may alternatively execute other actions as well.

If, on the other hand, the MT does receive an acknowledgment (at step 630), the MT transmits a request for data related to source and/or compatibility (step 650). If both are requested, they may be requested together, separately, in any order, etc. The MT then determines whether a matching source/information has been received (at step 660). Received data may be matching if any received source is in accordance with any stored source and/or if any received compatibility information is in accordance with any stored compatibility information (examples of how/when received sources and compatibility information are in accordance with stored sources and compatibility information, respectively, are presented hereinabove). If matching data is not received (at step 660), then the MT executes an action (step 640), as explained above. If, on the other hand, matching data is received (at step 660), then the MT may permit charging of the battery or batteries of the MT to begin (or continue) (step 670).

In an alternative embodiment of the method of the flowchart 600, the MT may elect to verify (via arrow 680) that the CU with which it is in wireless communication is the same CU to which it is connected. In other words, after the MT has determined that the CU with which it is in wireless communication is an appropriate, non-risky CU, but before charging is permitted, the MT may order the CU to vary the voltage supplied (step 685). (The CU 130 may vary the voltage (e.g., switch off power, reduce power, etc.) via, for example, the switch 490, which is between the charging contact 230 and the power input 240.) If the MT detects that the voltage has been varied (and hence that a known CU is connected thereto) (at arrow 687), then the MT permits charging (step 670). If, on the other hand, the MT detects that the voltage has not been varied (and hence that an unknown CU is connected thereto) (at arrow 689), then the MT may execute an action (step 640). If the MT emits a sound or memorializes the charging incident (at step 640), for example, then the MT may optionally proceed (via arrow 690) to permit charging (step 670). It should be noted that this option is available to the MT regardless of the steps traversed to reach step 640. A portable battery-operated electronic device in accordance with the present invention may therefore minimize, if not eliminate, the possibility of damage resulting from using a risky charging unit.

Although preferred embodiment(s) of the method and system of the present invention have been illustrated in the accompanying Drawings and described in the foregoing Detailed Description, it will be understood that the present invention is not limited to the embodiment (s) disclosed, but is capable of numerous rearrangements, modifications, and substitutions without departing from the spirit and scope of the present invention as set forth and defined by the following claims.

What is claimed is:

1. A method for authenticating a charging unit by a portable battery-operated electronic device, comprising the steps of:

detecting that said portable battery-operated electronic device has been connected to said charging unit;

broadcasting, by said portable battery-operated electronic device, an inquiry via a wireless link;

if no response to said inquiry is received by said portable battery-operated electronic device, executing at least one predetermined action by said portable battery-operated electronic device;

if a response to said inquiry is received by said portable battery-operated electronic device,
  determining whether a received value is in accordance with a stored value;
  if not, executing said at least one predetermined action by said portable battery-operated electronic device.

2. The method according to claim 1, further comprising the step of:
  if said received value is determined to be in accordance with said stored value, permitting charging by said charging unit of a battery of said portable battery-operated electronic device.

3. The method according to claim 1, wherein said step of broadcasting, by said portable battery-operated electronic device, an inquiry via a wireless link comprises the step of broadcasting using a short-range wireless transceiver.

4. The method according to claim 3, wherein said short-range wireless transceiver comprises a transceiver operating in accordance with Bluetooth technology.

5. The method according to claim 1, wherein said stored value comprises information relating to a source of said portable battery-operated electronic device.

6. The method according to claim 5, wherein said information relating to a source comprises a manufacturer of said portable battery-operated electronic device.

7. The method according to claim 1, wherein said stored value comprises an indication relating to at least one compatible charging unit or compatible portable battery-operated electronic device.

8. The method according to claim 1, further comprising the step of:
  transmitting, by said charging unit, said response to said inquiry, said response including said received value.

9. The method according to claim 8, wherein said inquiry and said response are encrypted.

10. The method according to claim 1, wherein said step of executing at least one predetermined action by said portable battery-operated electronic device comprises at least one of the following steps:
  preventing charging of a battery of said portable battery-operated electronic device;
  recording at least one of a time and a location of the connection to said charging unit in a memory of said portable battery-operated electronic device; and
  causing said portable battery-operated electronic device to emit at least one loud noise.

11. The method according to claim 1, wherein said step of executing at least one predetermined action by said portable battery-operated electronic device comprises the step of transmitting a message from said portable battery-operated electronic device to said charging unit, said message ordering said charging unit to vary a voltage supplied therefrom.

12. The method according to claim 11, further comprising the steps of
  if said charging unit varies said voltage supplied therefrom, permitting charging of a battery of said portable battery-operated electronic device; and
  if said charging unit does not vary said voltage supplied therefrom, preventing charging of said battery of said portable battery-operated electronic device or recording at least one of a time and a location of the connection to said charging unit in a memory of said portable battery-operated electronic device.

13. The method according to claim 1, wherein said portable battery-operated electronic device is comprised of a wireless mobile terminal.

14. The method according to claim 1, further comprising the step of:
  transmitting, by said charging unit, said response to said inquiry, said response including a Bluetooth identification.

15. An electronic device capable of authenticating a charging unit, comprising:
  a processor;
  a memory, said memory including at least one stored charging-unit-related value;
  at least one battery;
  a short range transceiver; and
  a logic module, said logic module interrelated with said processor and adapted to:
    detect connection to said charging unit;
    transmit a wireless inquiry in response to the detected connection using said short range transceiver;
    receive a wireless response to said wireless inquiry via said short range transceiver, said response including a received charging-unit-related value; and
    determine whether said received charging-unit-related value is in accordance with said at least one stored charging-unit-related value.

16. The electronic device of claim 15, wherein said short range transceiver is comprised of a transceiver that is operating in accordance with Bluetooth technological standards.

17. The electronic device of claim 15, wherein the electronic device is comprised of a mobile terminal.

18. The electronic device of claim 15, wherein said at least one stored charging-unit-related value comprises a source identifier.

19. The electronic device of claim 15, wherein said at least one stored charging-unit-related value comprises compatibility information.

20. The electronic device of claim 15, wherein said logic module is further adapted to:
  if said received charging-unit-related value is determined to be in accordance with said at least one stored charging-unit-related value, then permit charging of said at least one battery; and
  if said received charging-unit-related value is not determined to be in accordance with said at least one stored charging-unit-related value, then execute at least one predetermined action.

21. The electronic device of claim 20, wherein the adaptation to execute at least one predetermined action of said logic module further comprises at least one of the following adaptations to:
  prevent charging of said at least one battery;
  record at least one of a time and a location of the detected connection in said memory; and
  cause a speaker of the electronic device to emit at least one loud sound.

22. The electronic device of claim 15, wherein said logic module is further adapted to:
  if said received charging-unit-related value is determined to be in accordance with said at least one stored charging-unit-related value, then transmit an order to vary a voltage supplied to the electronic device;

if said voltage supplied to the electronic device is varied, permit charging of said at least one battery; and if said voltage supplied to the electronic device is not varied, execute at least one predetermined action.

23. A charging unit capable of being authenticated, comprising:

a processor;

a memory, said memory including at least one value;

a short range transceiver; and a logic module, said logic module interrelated with said processor and adapted to:

receive a wireless inquiry via said short range transceiver;

transmit said at least one value using said short range transceiver in response to said wireless inquiry;

receive, via said short range transceiver, an order to vary the voltage supplied from the charging unit; and vary the voltage supplied from the charging unit.

24. The charging unit of claim 23, wherein said at least one value comprises a source identifier.

25. The charging unit of claim 23, wherein said at least one value comprises compatibility information.

26. The charging unit of claim 23, wherein said logic module is further adapted to:

cause a switch to cut off the voltage supplied from the charging unit.

27. A method for authenticating a charging unit by a battery-powered electronic device, comprising the steps of:

detecting, by said battery-powered electronic device, connection to a charging unit;

transmitting, by said battery-powered electronic device, a request for source information;

preventing charging of a battery of said battery-powered electronic device if no source information is received from the connected charging unit.

28. The method of claim 27, further comprising the steps of:

receiving said source information;

comparing said source information to stored source information;

preventing charging of said battery of said battery-powered electronic device if said source information and said stored source information are not in accordance with one other.

29. The method of claim 27, further comprising the steps of:

receiving said source information;

comparing said source information to stored source information;

permitting charging of said battery of said battery-powered electronic device if said source information and said stored source information are in accordance with one another.

30. The method of claim 27, wherein said source information comprises a manufacturer of a charging unit.

* * * * *